(12) United States Patent
Schleicher et al.

(10) Patent No.: US 11,413,689 B2
(45) Date of Patent: Aug. 16, 2022

(54) CUTTING INSERTS WITH CONTROL CAVITIES

(71) Applicant: Kennametal Inc., Latrobe, PA (US)

(72) Inventors: Sebastian Schleicher, Fuerth (DE); Konrad Spitzenberger, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 144 days.

(21) Appl. No.: 16/885,504

(22) Filed: May 28, 2020

(65) Prior Publication Data
US 2021/0370411 A1 Dec. 2, 2021

(51) Int. Cl.
*B23B 27/16* (2006.01)

(52) U.S. Cl.
CPC ....... *B23B 27/1611* (2013.01); *B23B 27/1603* (2013.01); *B23B 2200/24* (2013.01); *B23B 2200/3681* (2013.01); *B23C 2200/085* (2013.01); *B23C 2200/208* (2013.01); *B23C 2200/367* (2013.01)

(58) Field of Classification Search
CPC . B23B 27/16; B23B 27/1603; B23B 2200/24; B23B 27/1611; B23B 2200/3681; B23C 2200/0455; B23C 2200/085; B23C 2200/125; B23C 2200/208; B23C 2200/367; B23C 5/06; B23C 5/202
See application file for complete search history.

(56) References Cited

U.S. PATENT DOCUMENTS

| | | | | |
|---|---|---|---|---|
| 3,800,379 A | * | 4/1974 | Hopkins | B23B 27/143 407/113 |
| 3,882,580 A | * | 5/1975 | Lundgren | B23B 27/143 407/116 |
| 3,885,281 A | * | 5/1975 | Stambler | B23B 27/1637 407/114 |
| 3,947,937 A | * | 4/1976 | Hertel | B23B 27/143 407/114 |
| 4,273,480 A | * | 6/1981 | Shirai | B23B 27/1618 407/114 |

(Continued)

FOREIGN PATENT DOCUMENTS

| | | | | |
|---|---|---|---|---|
| EP | 3421160 A1 | * | 1/2019 | ......... B23B 27/1611 |
| JP | 2013067004 A | * | 4/2013 | .......... B23B 27/143 |
| WO | WO2007057113 A1 | | 5/2007 | |

OTHER PUBLICATIONS

Aug. 5, 2021 Notice of Allowance CN App. No. 202030717270.0.

(Continued)

*Primary Examiner* — Sara Addisu
(74) *Attorney, Agent, or Firm* — Larry R. Meenan

(57) ABSTRACT

Cutting tool systems including a cutting tool and cutting inserts are disclosed. The cutting inserts have indexable cutting edges and seating face features which enable uniform facets along a portion of each cutting edge of the indexable insert. The first and second seating face surfaces of the cutting insert each comprise control cavities that adjoin the cutting edge facet surfaces. Each control cavity allows its corresponding cutting edge to have a facet width that is defined by the cavity to provide uniform surfaces. The control cavities reduce and limit the amount of the first and second seating face surfaces that need to be ground. Methods of making such cutting inserts are disclosed.

18 Claims, 7 Drawing Sheets

(56) References Cited

U.S. PATENT DOCUMENTS

| | | | | |
|---|---|---|---|---|
| 4,335,984 A | * | 6/1982 | Zweekly | B23B 27/143 407/114 |
| 4,441,841 A | * | 4/1984 | Mori | B23B 27/143 407/114 |
| 4,507,024 A | * | 3/1985 | Stashko | B23B 27/143 407/114 |
| D278,716 S | | 5/1985 | Pano | |
| 4,606,679 A | * | 8/1986 | Jeremias | B23B 27/143 407/114 |
| 4,616,963 A | * | 10/1986 | Habert | B23B 27/22 407/114 |
| 4,626,140 A | * | 12/1986 | Zweekly | B23B 27/143 407/114 |
| 4,856,942 A | * | 8/1989 | Bernadic | B23B 27/143 407/114 |
| 4,993,892 A | * | 2/1991 | Takahashi | B23B 27/065 407/114 |
| 5,067,858 A | * | 11/1991 | Cook | B23B 27/1614 407/114 |
| 5,215,415 A | * | 6/1993 | Fukuoka | B23B 27/143 407/114 |
| 5,813,308 A | * | 9/1998 | Wildey | B23D 61/04 83/835 |
| 6,039,515 A | * | 3/2000 | Lamberg | B23B 27/141 408/188 |
| D426,561 S | | 6/2000 | Brosnahan et al. | |
| D426,562 S | | 6/2000 | Kasperik et al. | |
| D426,839 S | | 6/2000 | Morrison et al. | |
| D427,215 S | | 6/2000 | Nelson | |
| 7,476,062 B2 | * | 1/2009 | Waggle | B23C 5/207 407/113 |
| D631,493 S | | 1/2011 | Tanaka et al. | |
| D633,535 S | | 3/2011 | Tanaka et al. | |
| D692,036 S | | 10/2013 | Schleicher et al. | |
| D700,225 S | | 2/2014 | Waggle | |
| D700,640 S | | 3/2014 | Choi et al. | |
| D736,841 S | | 8/2015 | Jung | |
| D748,703 S | | 2/2016 | Nam et al. | |
| D772,319 S | | 11/2016 | Nam et al. | |
| D805,116 S | | 12/2017 | Fukuyama | |
| D805,566 S | | 12/2017 | Oh et al. | |
| D807,935 S | | 1/2018 | Dudzinsky et al. | |
| D812,116 S | | 3/2018 | Choi et al. | |
| D815,164 S | | 4/2018 | Schleicher et al. | |
| D832,319 S | | 10/2018 | Muthuswamy et al. | |
| D835,167 S | | 12/2018 | Sakai | |
| 10,195,673 B2 | * | 2/2019 | Goldsmith | B23B 27/143 |
| D845,361 S | | 4/2019 | Komiyama et al. | |
| D847,883 S | | 5/2019 | Kobayashi | |
| 10,286,455 B2 | * | 5/2019 | Tomoda | B23B 27/22 |
| D898,085 S | | 10/2020 | Kim et al. | |
| 10,814,401 B2 | * | 10/2020 | Fukuyama | B23B 27/1622 |
| D907,670 S | | 1/2021 | Nagafuchi et al. | |
| D921,075 S | | 6/2021 | Park et al. | |
| D922,460 S | | 6/2021 | Park et al. | |
| 11,052,465 B2 | * | 7/2021 | Jonsson | B23B 27/1655 |
| 2009/0155004 A1 | * | 6/2009 | Jansson | B23C 5/202 407/40 |
| 2010/0119313 A1 | * | 5/2010 | Hartlohner | B23B 27/1618 407/103 |
| 2010/0129166 A1 | * | 5/2010 | Hartlohner | B23B 27/1618 407/102 |
| 2010/0275749 A1 | * | 11/2010 | Kobayashi | B23B 27/143 83/13 |
| 2012/0087751 A1 | * | 4/2012 | Yamaguchi | B23B 27/143 407/115 |
| 2012/0128438 A1 | * | 5/2012 | Tanaka | B23B 27/141 407/115 |
| 2013/0156515 A1 | * | 6/2013 | Satran | B23C 5/207 407/48 |
| 2021/0046555 A1 | * | 2/2021 | Todkar | B23B 51/048 |
| 2021/0086269 A1 | * | 3/2021 | Maeno | B23B 27/1611 |

OTHER PUBLICATIONS

Jul. 13, 2021 Notice of Allowance U.S. Appl. No. 29/736,176.
May 27, 2021 Office Action (non-US) CN App. No. 202030717270.0.
Mar. 9, 2021 Office Action (non-US) CN App. No. 202030717270.0.

* cited by examiner

CUTTING INSERTS WITH CONTROL CAVITIES

FIELD OF THE INVENTION

The present invention relates to indexable cutting inserts and cutting tool systems, and more particularly relates to indexable double-sided cutting inserts with features to ensure uniform facet widths.

BACKGROUND INFORMATION

Modern high-performance cutting tools use replaceable and typically indexable inserts owing to the high cutting speeds and feeds supported by the superior insert materials. Common materials for inserts include tungsten carbide, polycrystalline diamond and cubic boron nitride.

Indexable inserts use a symmetrical polygonal shape, such that when the first cutting edge is blunt they can be rotated or flipped over, presenting a fresh cutting edge which is accurately located at the same geometrical position. Geometrical repeatability saves time in manufacturing by allowing periodical cutting edge renewal without the need for tool grinding, setup changes, or entering of new values into a CNC program.

Common shapes of indexable inserts include square, triangular and rhombus (diamond) providing a plurality of cutting edges, on each side of the insert. A double-sided or invertible square insert, for example, can be flipped over to provide eight cutting edges.

Conventional indexable inserts comprise features on the seating faces which are ground to provide the desired clearance surfaces and tool holder contact surfaces. Grinding the surfaces may lead to inconsistent and non-uniform widths of facet surfaces along the cutting edges. The failure to provide uniform facet surfaces may lead to less effective cutting edges and may lead to the indexable inserts to fail a visual inspection for uniformity.

SUMMARY OF THE INVENTION

Cutting inserts are provided that include seating face features which enable uniform facets along a portion of each cutting edge of the indexable insert. The first and second seating faces of the cutting insert each comprise control cavities that adjoin the cutting edge margin facet surfaces. Each control cavity allows its corresponding cutting edge to have a margin facet width that is defined by the cavity to provide the first and second faces with uniform surfaces. In addition, the control cavities reduce and limit the amount of the first and second seating faces that need to be ground.

An aspect of the present invention provides a cutting insert, comprising a first face, a second face opposite the first face, a plurality of side surfaces adjoining the first face and the second face, a plurality of cutting edges formed at intersections between the plurality of side surfaces and the first face a plurality of margin facet surfaces formed on the first face, wherein each of the plurality of margin facet surfaces is formed adjacent to each of the plurality of the cutting edges, and a plurality of control cavities recessed in the first face, wherein each of the plurality of control cavities is adjoining each of the first facet surfaces.

Another aspect of the present invention provides a cutting tool comprising a tool body comprising a cutting insert mounted in an insert pocket of the tool body.

A further aspect of the present invention provides a method of making a cutting insert. The method comprises and sintering metal carbide powder to form an insert blank comprising a first face comprising a plurality of control cavities recessed in the first face, a second face opposite the first face, and a plurality of side surfaces adjoining the first face and the second face, surface grinding a plurality of margin facet surfaces located on the first face between each of the control cavities and one of the plurality of side surfaces to form a cutting edge at an intersection of each of the plurality of margin facet surfaces and an adjacent one of the plurality of side surfaces.

These and other aspects of the present invention will be more apparent from the following description.

DETAILED DESCRIPTION

Figure 1:
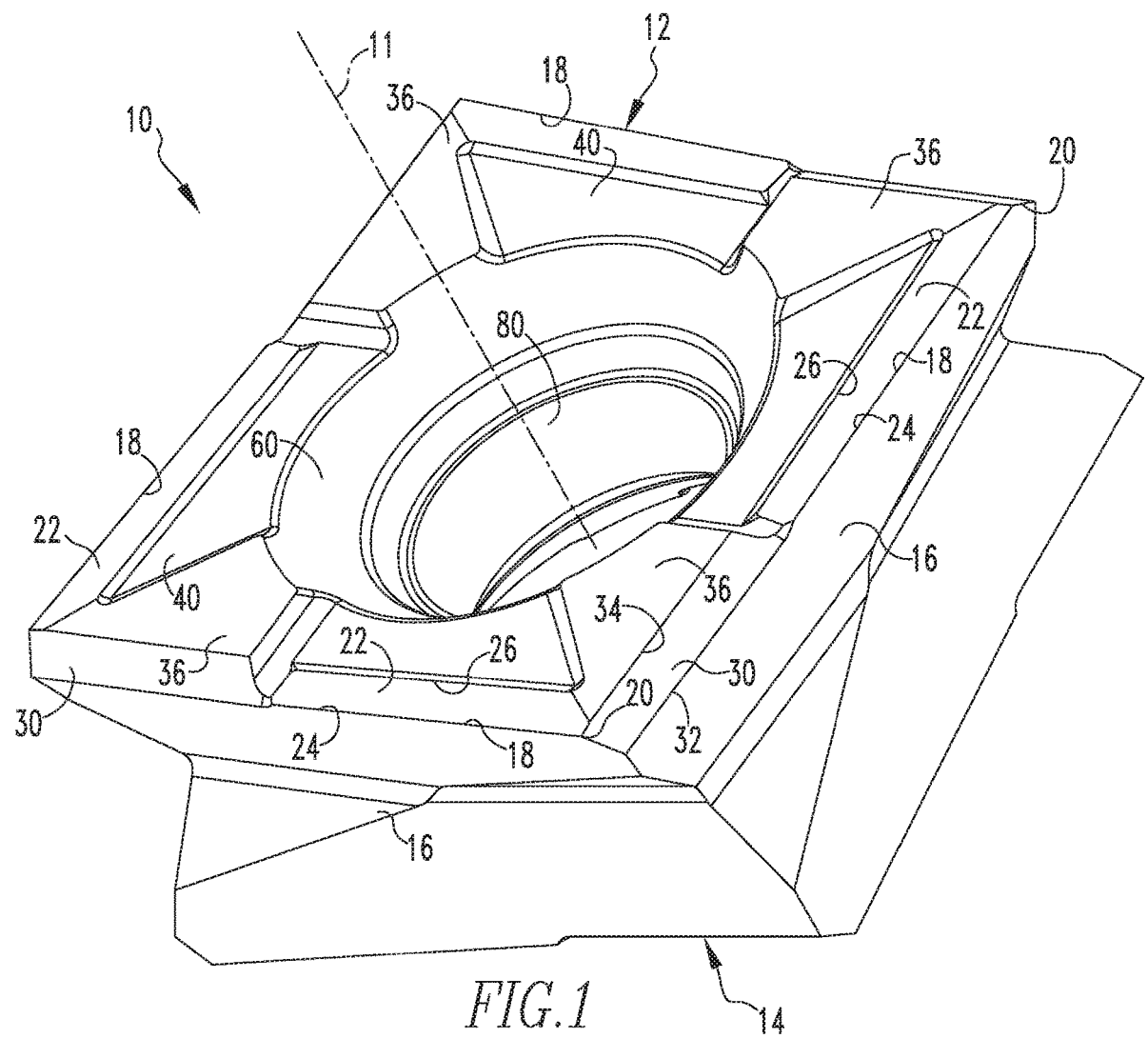
FIG. 1 is a top isometric view of a cutting insert in accordance with an embodiment of the invention.
Figures 2, 3:
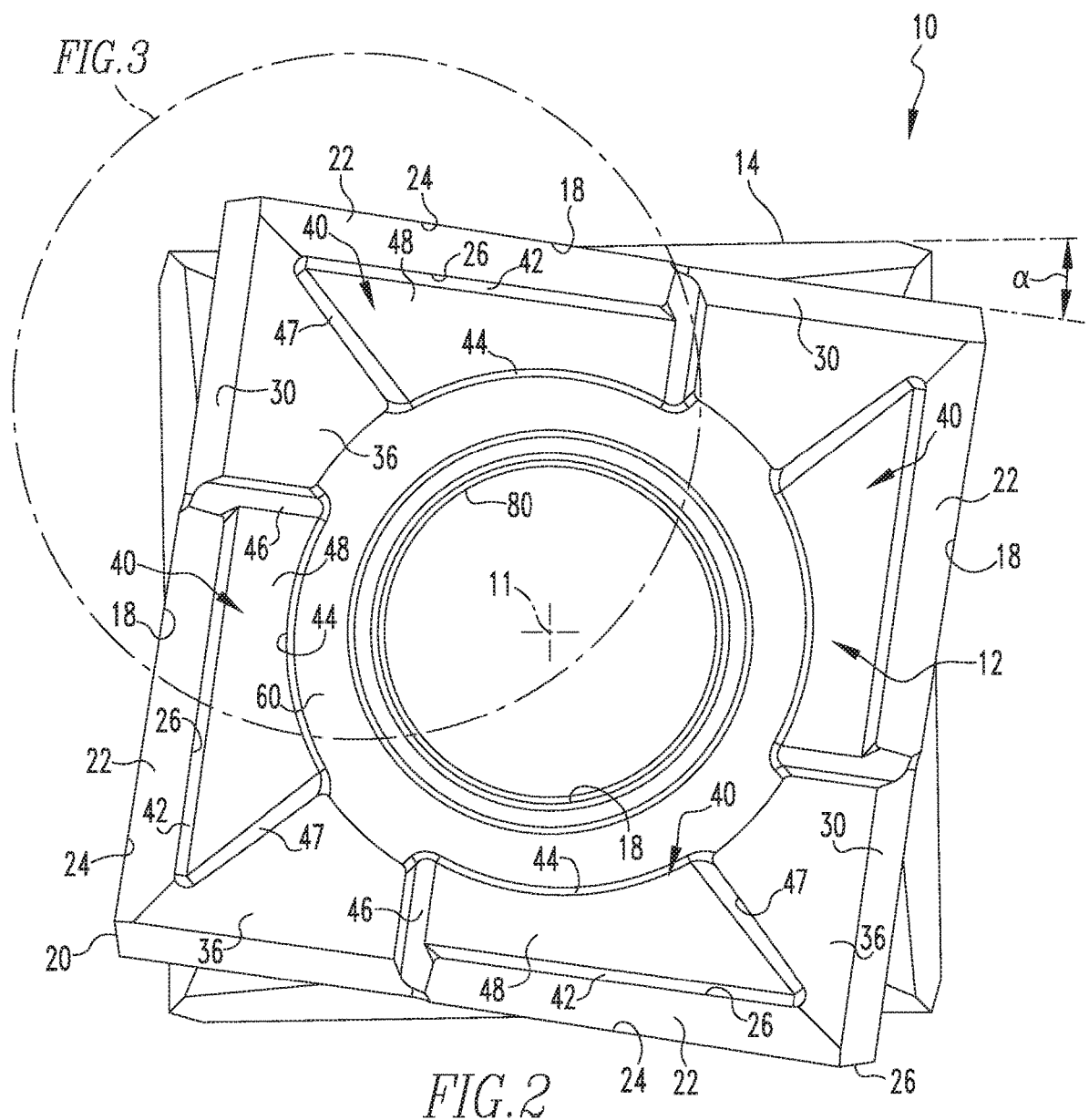
FIG. 2 is a top view of the cutting insert of FIG. 1.
FIG. 3 is an enlarged view of the circled area of the cutting insert of FIG. 2.
Figure 3:
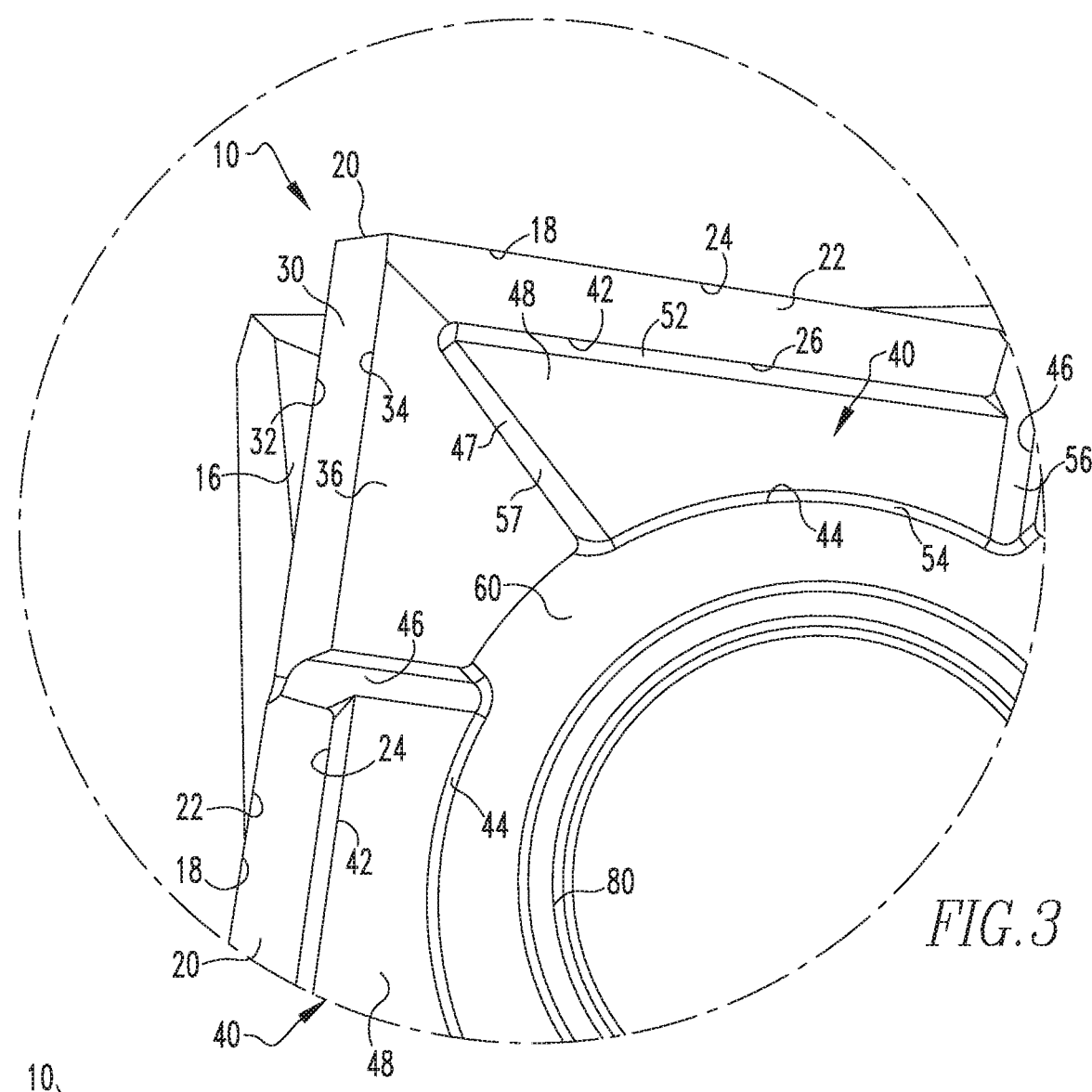

FIGS. 1 and 2 illustrate a cutting insert 10 in accordance with an embodiment of the present invention. The cutting insert 10 may comprise a double-sided, polygonal, tangential cutting insert. In the embodiment shown, the cutting insert 10 is of a generally square shape including a first face 12, a second face 14 on an opposite side with respect to the first face 12 and a plurality of side surfaces 16 extending between the first face 12 and the second face 14. However, it is to be understood that the double-sided cutting insert 10 may also be triangular, rectangular, pentagonal or the like. As shown in FIGS. 1 and 2, the cutting insert 10 comprises a central axis 11 and a mounting through hole 80 extending from the first face 12 to the second face 14. The central axis 11 of the mounting through hole 80 is perpendicular to the top surface 12 and the bottom surface 14. The central axis 11 defines an axis of rotation of the cutting insert 10. The mounting through hole 80 may be structured and arranged to receive a clamping stud 90. As shown in FIG. 2, the first face 12 and the second face 14 may be twisted relative to one another about the central axis 11. The twist angle α between the first face 12 and the second face 14 may range from 0 degrees to 30 degrees. As shown in FIG. 2, the twist angle α may be measured between an edge of the first face 12 and an edge of the second face 14 formed by an intersection of the side surface 16 and the first face 12 and the second face 14.

In the embodiment shown, the first face 12 and the second face 14 may be identical. The first face 12 will be described in detail herein for brevity. However, it will be appreciated that any discussion of the first face 12 may apply to the second face 14. As is known in the art, the first face 12 may become the top surface and the second face may become the bottom surface when mounted within a tool holder (not shown), and vice versa. As shown in FIGS. 1 and 2, the first face 12 of the cutting insert 10 may have 90 degree rotational symmetry with respect to the central axis 11 of the mounting through hole 80.

As shown in FIGS. 1 and 2, a cutting edge 18 is formed at the intersection between the first face 12 and a respective side surface 16 for a total of four cutting edges 18. In certain embodiments, a cutting edge 18 may be formed at the intersection between the second face 14 and a respective side surface 16 for a total of four additional cutting edges 18 (i.e. a total of eight cutting edges 18 for the cutting insert 10). Each cutting edge 18 is identical to each other. Thus, only one cutting edge 18 will be described herein for brevity, and it will be appreciated that any description herein of one cutting edge 18 applies to all the cutting edges 18.

As shown in FIGS. 1 and 2, each cutting edge 18 may extend from a first corner portion 20 toward a second corner portion 20. In accordance with an embodiment of the present invention, each primary cutting edge 18 may extend only over a part of the intersection between the first face 12 and a respective side surface 16. For example, the length of each cutting edge 18 may typically range from 20 to 80 percent of the length of the side surface 16, or from 40 to 60 percent of the length of the side surface 16.

In accordance with an embodiment of the present invention, a margin facet surface 22 is formed on the first face 12 adjoining each cutting edge 18 for a total of four margin facet surfaces 22. In certain embodiments, a margin facet surface 22 may be formed adjoining each cutting edge 18 of the second side surface 14 for a total of four additional margin facet surfaces 22 (i.e. a total of eight cutting edges 18 for the cutting insert 10).

As shown in FIGS. 1 and 2, the margin facet surface 22 may extend along the entire length of each cutting edge 18. In accordance with an embodiment of the present invention, the margin facet surfaces may provide a clearance for the cutting edge 18. In certain embodiments, the margin facet surfaces 22 may include a first edge 24 forming the cutting edge 18 and a second edge 26 spaced from the first edge 24. In the embodiment shown, each margin facet surface 22 may be generally planar between the first edge 24 and the second edge 26. However, any other suitable arrangement may be used, e.g., the margin facet surface 22 may be concave, convex or the like. The width of the margin facet surface 22 may be varied based on the location of the cavity 40, as further described below.

Figure 4:
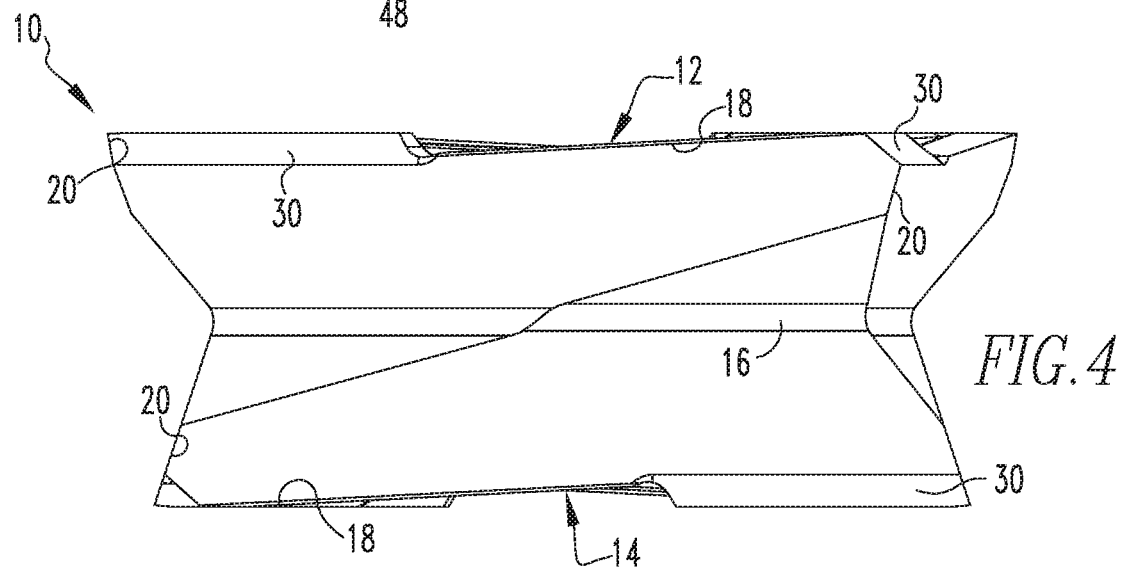
FIG. 4 is a side view of the cutting insert of FIG. 1.
Figure 5:
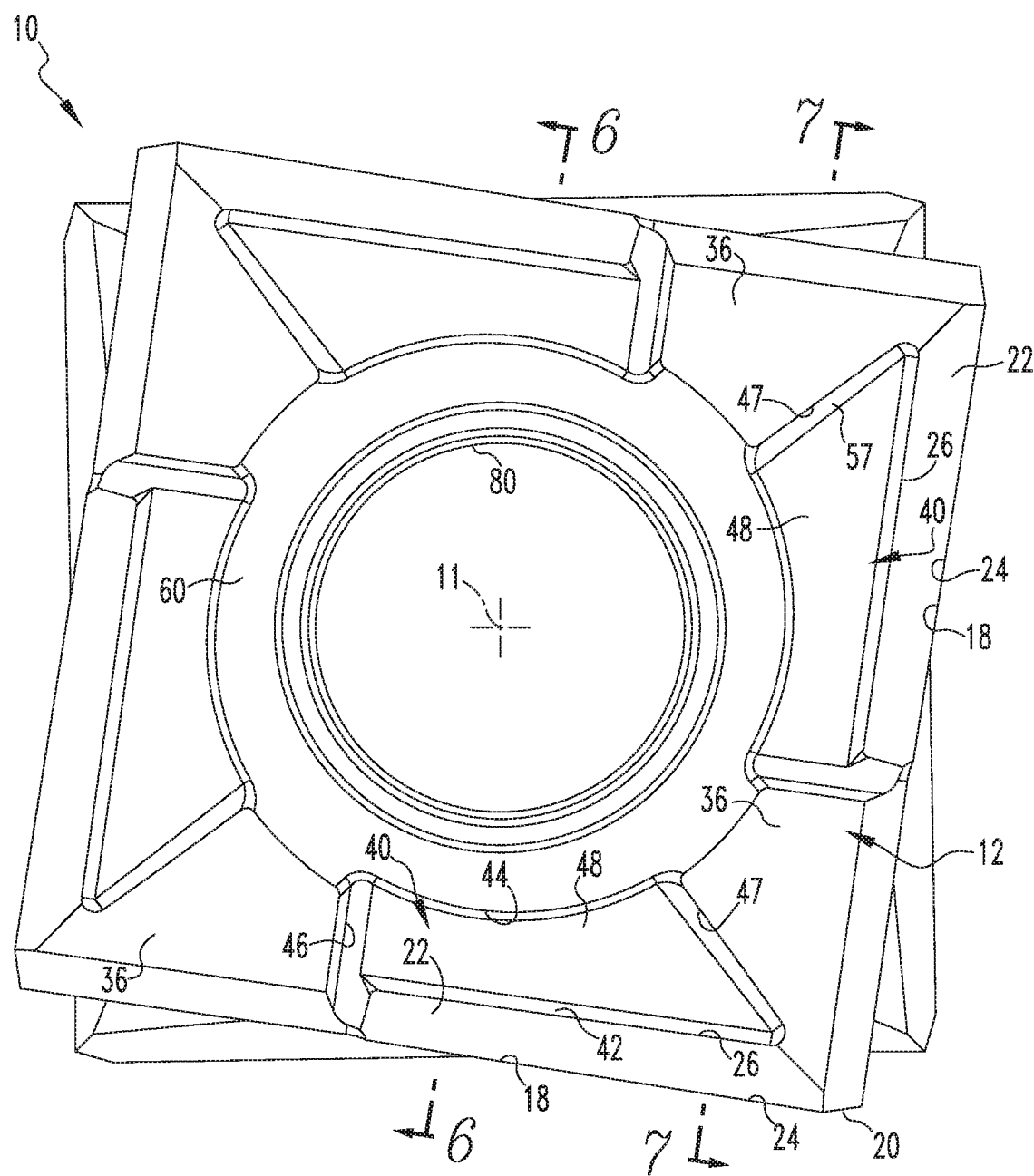
FIG. 5 is a top view of the cutting insert of FIG. 1.

As shown in FIG. 4, a corner wiper facet surface 30 may be formed at the intersection between the first face 12 and a respective side surface 16 for a total of four corner wiper facet surfaces 30. In certain embodiments, a corner wiper facet surface 30 may be formed at the intersection between the second face 14 and a respective side surface 16 for a total of four additional corner wiper facet surfaces 30 (i.e. a total of eight corner wiper facet surfaces 30 for the cutting insert 10). Each corner wiper facet surface 30 is identical to each other. Thus, only one corner wiper facet surface 30 will be described herein for brevity, and it will be appreciated that any description herein of one corner wiper facet surface 30 applies to all the corner wiper facet surfaces 30.

As shown in FIGS. 2 and 4, the corner wiper facet surface 30 extends along the intersection of side surface 16 and the first face 12 from the margin facet surface 22 to a second corner portion 20. In accordance with an embodiment of the present invention, the corner wiper facet surface 30 may include a first edge 32 forming the intersection with the side surface 16 and a second edge 34 spaced from the first edge 32. In the embodiment shown, each corner wiper facet surface 30 may be generally planar between the first edge 32 and the second edge 34. However, any other suitable arrangement may be used, e.g., the corner wiper facet surface 30 may be concave, convex or the like. In the embodiment shown, the length of the corner wiper facet surface 30 is less than the length of the margin facet surface 20. However, any other suitable arrangement may be used, e.g., the length of the corner wiper facet surface 30 may be greater than or equal to the length of the margin facet surface 20.

In accordance with an embodiment of the present invention, the first edge 32 may form a wiper cutting edge. As shown in FIGS. 1 and 2, each first edge 32 may extend from the cutting edge 18 to the second corner portion 20. In accordance with an embodiment of the present invention, each first edge 32 may extend only over a part of the intersection between the first face 12 and a respective side surface 16. For example, the length of each first edge 18 may typically range from 10 to 60 percent of the length of the side surface 16, or from 15 to 40 percent of the length of the side surface 16. In the embodiment shown, the length of the first edge 32 is less than the length of the cutting edge 18. However, any other suitable arrangement may be used, e.g., the length of the first edge 32 may be greater than or equal to the length of the cutting edge 18.

As shown in FIGS. 1, 2 and 4, each of the side surfaces 16 are arranged at right angles to one another and four corner portions 20 which connect the side surfaces to one another. The corner portions 20 connect each side surface 16 and extends between the first face 12 and the second face 14. Because each corner portion 20 is substantially identical to each other, only one corner portion 20 is discussed herein for brevity, and it will be appreciated that any description herein of one corner portion 20 applies to all corner portions 20. In accordance with an embodiment of the present invention, the plurality of corner portions 20 extend between each of the plurality of primary cutting edges 18 and each of the plurality of corner wiper facet surfaces 30.

In accordance with an embodiment of the present invention, a contact surface 36 is formed on the first face 12 extending radially inwardly from the second edge 34 of each corner wiper facet surface 30 for a total of four contact surfaces 36. In certain embodiments, a contact surface 36 may be formed on the second face 14 extending from the second edge 34 of each corner wiper facet surface 30 for a total of four additional contact surfaces 36 (i.e. a total of eight contact surfaces 36 for the cutting insert 10). Each contact surface 36 is identical to each other. Thus, only one contact surface 36 will be described herein for brevity, and it will be appreciated that any description herein of one contact surface 36 applies to all the contact surfaces 36.

Figure 7:
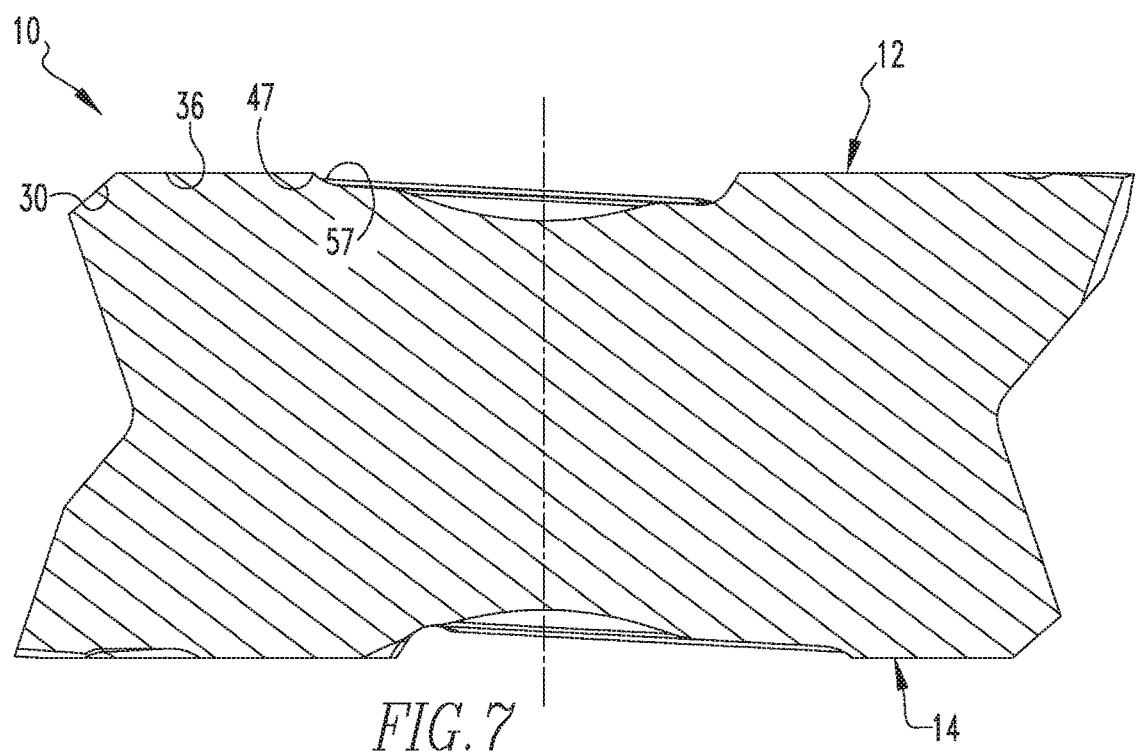
FIG. 7 is a side-sectional view of the cutting insert taken through line 7-7 of FIG. 5.

As shown in FIGS. 1, 2 and 7, the contact surface 36 extends from the second edge 34 of the corner wiper facet surface to a mouth portion 60 of the mounting hole 80. The plurality of contact surfaces 36 provide an area on the first face 12 to be engaged by a pocket 116 of the cutting tool 100. In the embodiment shown, the contact surface 36 is generally planar, however, any other suitable arrangement may be used. In accordance with an embodiment of the present invention, the plurality of contact surfaces 36 may be the highest surface elevation on the first face 12 and the second face 14.

In accordance with an embodiment of the present invention, a control cavity 40 is formed on the first face 12 extending radially inwardly from the second edge 26 of the margin facet surface 22 between adjacent contact surfaces 36 for a total of four control cavities 40. The control cavities may be recessed in the first face 12. In certain embodiments, a control cavity 40 may be formed on the second face 14 extending from the second edge 26 of each margin facet surface 22 for a total of four additional control cavities (i.e. a total of eight control cavities for the cutting insert 10). Each control cavity 40 is identical to each other. Thus, only one control cavity 40 will be described herein for brevity, and it will be appreciated that any description herein of one control cavity 40 applies to all the control cavities 40. As more fully described below, the control cavities 40 may define the width of the margin facet surfaces 22 to provide uniform cutting edges during fabrication of the cutting insert 10.

As shown FIGS. 2 and 3, the control cavity 40 comprises a bottom surface 48, a first sidewall portion 42, a radially inward edge 44, a second sidewall portion 46 and a third sidewall portion 47. The first sidewall portion 42 extends from the bottom surface 48 adjacent to the second edge 26 of the margin facet surface 22. The radially inward edge 44 is provided along the mouth 60 of the mounting hole 80. The second sidewall portion 46 extends from the bottom surface 48 from the radially inward edge 44 toward the first sidewall portion 42 between the margin facet surface 22 and the corner wiper facet surface 30. The third sidewall portion 47 extends from the bottom surface 48 from the radially inward edge 44 toward the first sidewall portion 42 opposite the second sidewall portion 46.

Figure 6:
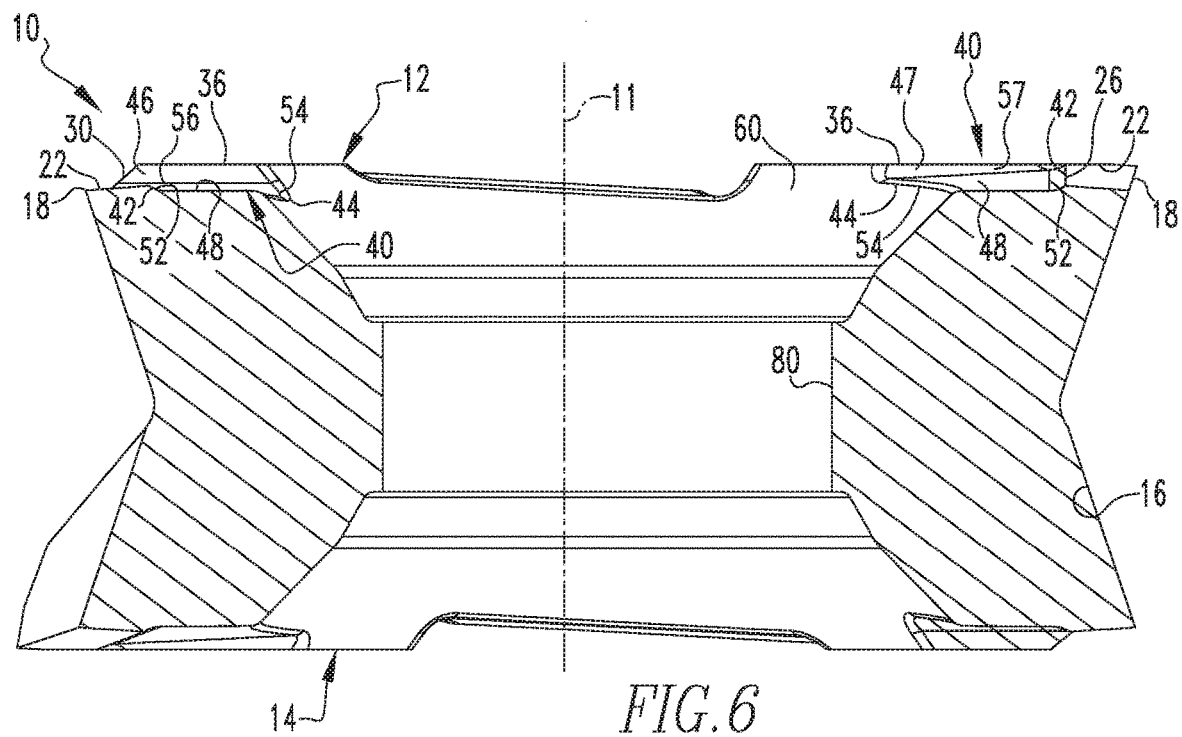
FIG. 6 is a side-sectional view of the cutting insert taken through line 6-6 of FIG. 5.

As shown in FIGS. 3 and 6, the control cavity 40 may include a first transitional fillet 52 between the bottom surface 48 and the first sidewall portion 42, a radially inward transitional fillet 54 between the bottom surface 48 and the radially inward edge 44, a second transitional fillet 56 between the bottom surface 48 and the second sidewall portion 46 and a third transitional fillet 57 between the bottom surface 48 and the third sidewall portion 47. In accordance with an embodiment of the present invention, the transitional fillets may comprise a generally semicircular cross-section. However, any other suitable cross-sectional shape of transitional fillet may be used, e.g., rectangular, square, trapezoidal, hexagonal, ovular, triangular, or the like. Alternatively, the transitional fillets may be provided as angled walls from the bottom surface 48. In accordance with an embodiment of the present invention, the transitional fillets may help define the shape of the control cavity 40 on the first face 12.

In accordance with an embodiment of the present invention, during the fabrication of the cutting insert 10, the control cavities 40 may be provided on the first face 12 prior to the margin facet surfaces 22, the corner wiper facet surfaces 30 and the contact surfaces 36. In certain embodiments, the control cavities 40 may be pressed into the first face 12 and the second face 14 during the fabrication process. In certain embodiments, the control cavities 40 may be formed by an insert mold during the pressing fabrication step of the cutting insert 10.

In accordance with an embodiment of the present invention, during fabrication of the cutting insert 10, an insert blank may be conventionally pressed from powder and sintered by any means known in the art to form an initial insert blank comprising a first face, a second face opposite the first face, and a plurality of side surfaces. In accordance with an embodiment of the present invention, the first face and/or the second face initial insert blank may include the control cavities 40. The plurality of side surfaces of the insert blank may then be ground to provide the desired shapes known to one skilled in the art. The first face and the second face may then be initially ground to achieve the desired thickness of the cutting insert and to finish the plurality of contact surfaces 36. The margin facet surfaces 22 may be surface finished by grinding to form the cutting edges 18 at intersections between the plurality of side surfaces and the control cavities 40 of the first face and/or the second face. The corner wiper facet surfaces 30 may then be surface finished by grinding to form the wiper cutting edges 32 at intersections between the plurality of side surfaces and the first face and/or the second face.

As shown in FIGS. 3 and 4, the second sidewall portion 46 and the second transitional fillet 56 may extend from the radially inward edge 44 to the intersection between the first face 12 and the side surface 16. In the embodiment shown, the transitional fillet 56 is provided between and separates the margin facet surface 22 and the corner wiper facet surface 30. The transitional fillet 56 extending to the side surface 16 to interrupt the margin facet surface 22 may help define the length of the margin facet surface 22 along the intersection of each side surface 16 and the first face 12. This allows each margin facet surface 22 to have a uniform length from a first corner portion 20 to the transitional fillet 56.

As shown in FIGS. 6 and 7, the bottom surface 48 of the control cavity 40 may be recessed from the margin facet 22 and the adjoining contact surfaces 36. The bottom surface 48 of the cavity 40 being recessed from the margin facet surface 22 may define the desired width of the margin facet surface 22 prior to the grinding of the first face 12 and the second face 14. This allows each margin facet surface 22 to have a uniform width from the cutting edge 18 to the control cavity 40.

In certain embodiments, the control cavities 40 reduce the amount of the first face 12 and the second face 14 that need to be ground during fabrication of the cutting insert 10. The control cavities 40 may minimize the time and amount of grinding otherwise required to form the margin facet surfaces 22. In accordance with an embodiment of the present invention, the control cavities 40 allow the margin facet surfaces 22 of each of the cutting edges 18 to be ground uniformly. Uniformity of the grinding of the margin facet surfaces 22 may provide a more reliable cutting edge 18 and avoids visual differences on the first face 12 and the second face 14.

In accordance with an embodiment of the present invention, the control cavities 40 may limit the variation between adjacent margin facet surfaces 22 and corner wiper facet surfaces 30 during the grinding steps of the cutting insert 10 fabrication process. In certain embodiments, the control cavities 40 allow the margin facet surfaces 22, corner wiper facet surfaces 30 and contact surfaces 36 to be uniform along each side of the first face 12 and the second face 14.

The cutting inserts 10 may be made of any suitable material, such as tool steels, cemented carbides, and superhard material, such as cubic boron nitride (CBN), polycrystalline cubic boron nitride (PCBN), polycrystalline diamonds (PCD), tungsten carbide (WC), cermet, ceramic, and the like. The cutting inserts 10 of the present invention may be fabricated by any suitable technique, such as carbide powder pressing, grinding or additive manufacturing to provide the plurality of cavities, side surfaces, contact surfaces and facet surfaces.

Figure 8:
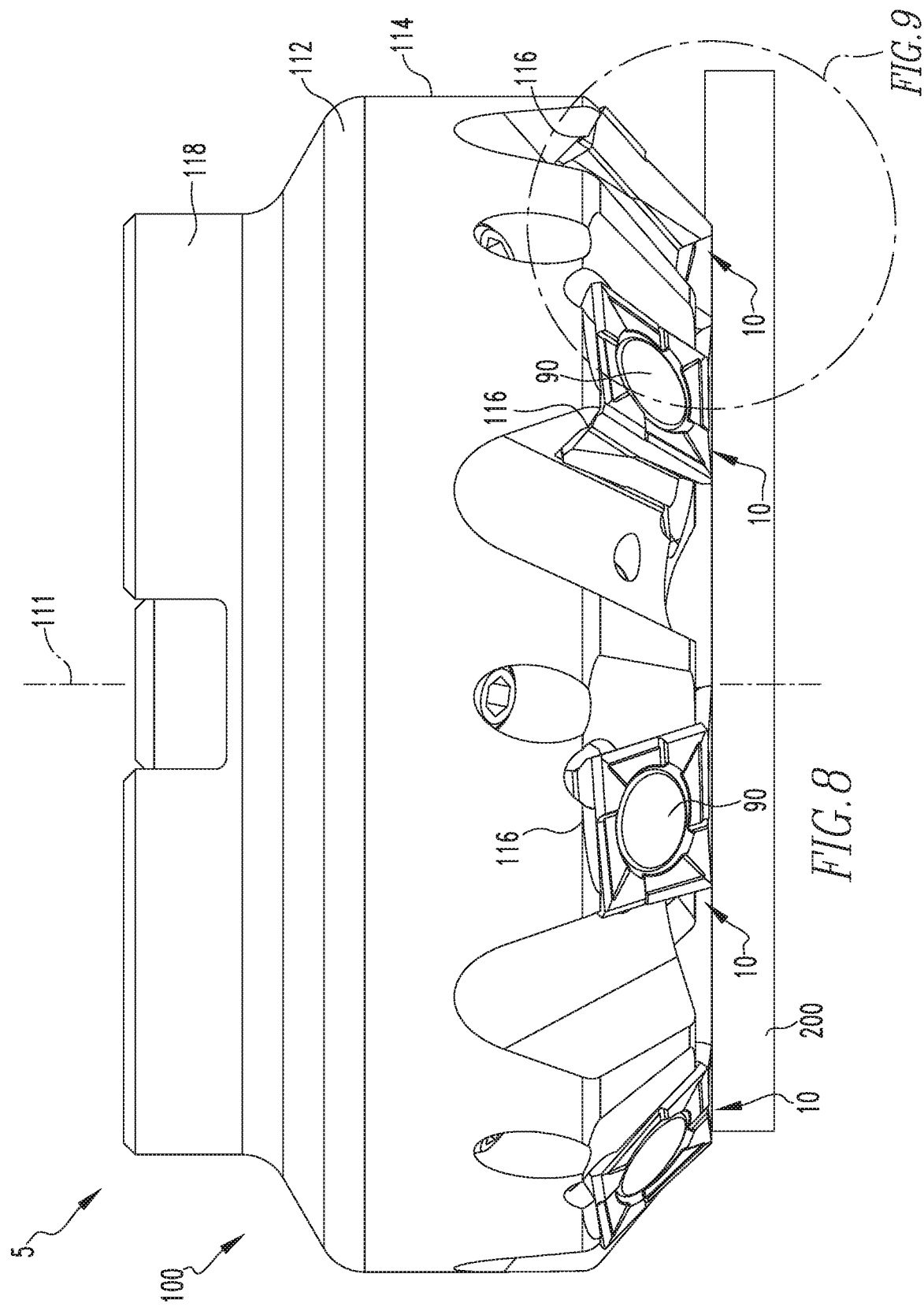
FIG. 8 is a front view of a cutting tool, such as a milling cutter, with the cutting insert of FIG. 1 mounted in a pocket of the cutting tool.
Figure 9:
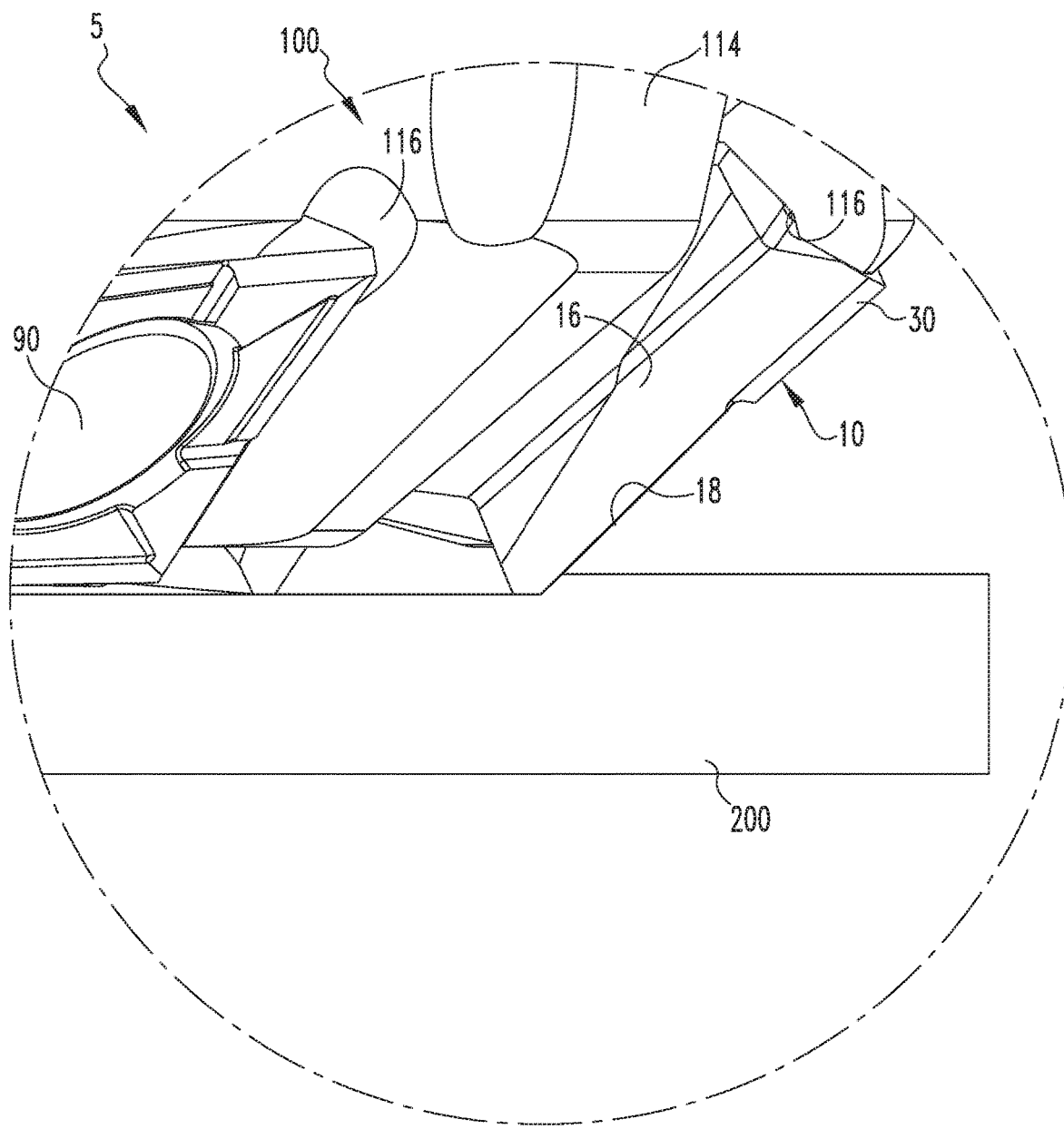
FIG. 9 is an enlarged view of the circled area of the cutting tool of FIG. 8.

FIGS. 8 and 9 illustrate a cutting tool system 5 in accordance with an embodiment of the present invention. The cutting tool system 5 includes a cutting tool 100 and a plurality of cutting inserts 10. The cutting tool 100 comprises a tool body 112 including a cutting end 114 with a plurality of circumferentially-spaced pockets 116, and a mounting end 118 opposite the cutting end 114. The tool body 112 is designed to be rotatably driven about a central longitudinal axis 111. In the embodiment shown, the cutting tool 100 is commonly known as a right-hand milling cutter and includes a total of seven pockets 116. However, it will be appreciated that the invention is not limited by the number of pockets 116, and that the invention can be practiced with any desirable number of pockets that provide the desired cutting capabilities. Each of the pockets 116 can receive a cutting insert, which is securely held in the pocket 116 by means of a clamping stud 90. However, any other suitable method of securing the cutting insert 10 in the pocket may be used, e.g., insert screws, clamping wedges, bolts, pins, or the like. In the embodiment shown, each of the pockets 116 of the cutting tool 100 receive a single cutting insert 10 to contact the workpiece 200.

The side surfaces 16 of the cutting insert 10 engage the pocket 116 when the cutting insert 10 is mounted in the tool body 112 during cutting operations. In certain embodiments, the contact surfaces 36 of the first and second faces 12, 14 and at least two side surfaces 16 should engage the tool body 112 when the cutting insert 10 is properly indexed in the tool body 112. In accordance with an embodiment of the present invention, the number of times that the cutting insert 10 can be indexed depends on the geometric shape of the cutting insert 10.

For purposes of the description above, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A cutting insert, comprising:
    a first face;
    a second face opposite the first face;
    a plurality of side surfaces adjoining the first face and the second face;
    a plurality of cutting edges formed at intersections between the plurality of side surfaces and the first face;
    a plurality of margin facet surfaces formed on the first face, wherein each of the plurality of margin facet surfaces is formed adjacent to each of the plurality of the cutting edges; and
    a plurality of cavities recessed in the first face, wherein each of the plurality of cavities is adjoining each of the margin facet surfaces, and
    wherein the intersections between the plurality of side surfaces and the first face further comprise a plurality of corner wiper facet surfaces, wherein each of the plurality of corner wiper facet surfaces extends from the margin facet surface to a corner portion.

2. The cutting insert of claim 1, wherein each of the plurality of cavities comprise a bottom surface recessed from the adjoining margin facet surface.

3. The cutting insert of claim 1, wherein each of the plurality of cavities comprise:
    a bottom surface; and
    a first sidewall portion extending from the bottom surface adjacent to the margin facet surface.

4. The cutting insert of claim 3, wherein each of the plurality of cavities comprise a first transitional fillet provided between the bottom surface and the first sidewall portion.

5. The cutting insert of claim 1, further comprising a mounting hole comprising a central axis extending from the first face to the second face, and wherein the first face is rotationally symmetrical with respect to the central axis of the mounting hole.

6. The cutting insert of claim 1, wherein each of the plurality of cutting edges is formed along a partial length of the intersection between the plurality of side surfaces and the first face.

7. The cutting insert of claim 1, wherein each of the plurality of margin facet surfaces comprise a first side edge forming the cutting edge and a second side edge adjoining the cavity.

8. The cutting insert of claim 1, wherein a length of each of the plurality of corner wiper facet surfaces is less than a length of each of the plurality of margin facet surfaces.

9. The cutting insert of claim 1, further comprising a plurality of contact surfaces on the first face extending from each of the plurality of corner wiper facet surfaces.

10. The cutting insert of claim 1, wherein each of the plurality of cavities extend from a first contact surface to an adjacent second contact surface on the first face.

11. The cutting insert of claim 1, wherein each of the plurality of cavities extend from the margin facet surface to a mouth portion of a mounting hole extending from the first face to the second face.

12. The cutting insert of claim 1, wherein the cutting insert is a tangential cutting insert.

13. The cutting insert of claim 1, wherein the second face comprises:
    a plurality of cutting edges formed at intersections between the plurality of side surfaces and the second face;
    a plurality of margin facet surfaces formed on the second face, wherein each of the plurality of margin facet surfaces is formed adjacent to each of the plurality of the cutting edges; and
    a plurality of cavities recessed in the second face, wherein each of the plurality of cavities is adjoining each of the plurality of margin facet surfaces, and wherein the intersections between the plurality of side surfaces and the second face further comprise a plurality of corner wiper facet surfaces, wherein each of the plurality of corner wiper facet surfaces extend from the margin facet surface to a corner portion.

14. The cutting insert of claim 13, wherein the first face is twisted relative to the second face about a central axis of the cutting insert.

15. The cutting insert of claim 13, further comprising a mounting hole comprising a central axis extending from the first face to the second face, and wherein the first face and the second face are rotationally symmetrical with respect to the central axis of the mounting hole.

16. The cutting insert of claim 13, wherein a transitional fillet is provided between each of the plurality of margin facet surfaces and each of the plurality of corner wiper facet surfaces.

17. A cutting tool comprising a tool body comprising the cutting insert as recited in claim 1 mounted in an insert pocket of the tool body.

18. A method of making a cutting insert of claim 1 comprising:
pressing and sintering metal carbide powder to form an insert blank comprising a first face comprising a plurality of cavities recessed in the first face, a second face opposite the first face, and a plurality of side surfaces adjoining the first face and the second face; and
surface grinding a plurality of margin facet surfaces located on the first face between each of the cavities and one of the plurality of side surfaces to form a cutting edge at an intersection of each of the plurality of margin facet surfaces and an adjacent one of the plurality of side surfaces.

\* \* \* \* \*